(12) United States Patent
Usgaonkar

(10) Patent No.: US 8,996,802 B1
(45) Date of Patent: Mar. 31, 2015

(54) METHOD AND APPARATUS FOR DETERMINING DISK ARRAY ENCLOSURE SERIAL NUMBER USING SAN TOPOLOGY INFORMATION IN STORAGE AREA NETWORK

(75) Inventor: Ameya Prakash Usgaonkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 155 days.

(21) Appl. No.: 11/810,800

(22) Filed: Jun. 6, 2007

(51) Int. Cl.
*G06F 15/173* (2006.01)
*G06F 12/02* (2006.01)

(52) U.S. Cl.
CPC .................................. *G06F 12/02* (2013.01)
USPC ........................... 711/114; 709/220; 709/226

(58) Field of Classification Search
CPC .................................. G06F 3/06; G06F 12/00
USPC .................................. 711/114; 709/220, 226
See application file for complete search history.

(56) References Cited

U.S. PATENT DOCUMENTS

| | | | |
|---|---|---|---|
| 6,697,875 B1 * | 2/2004 | Wilson | 709/245 |
| 6,904,477 B2 * | 6/2005 | Padmanabhan et al. | 710/74 |
| 7,127,545 B1 * | 10/2006 | Nandi et al. | 710/316 |
| 7,162,575 B2 * | 1/2007 | Dalal et al. | 711/112 |
| 7,237,042 B2 * | 6/2007 | Douglas et al. | 710/3 |
| 7,328,298 B2 * | 2/2008 | Kamakura et al. | 710/305 |
| 7,478,177 B2 * | 1/2009 | Cherian et al. | 710/9 |
| 7,487,177 B2 * | 2/2009 | Kilian-Kehr et al. | 1/1 |
| 7,496,745 B1 * | 2/2009 | Lok et al. | 713/2 |
| 2003/0189930 A1 * | 10/2003 | Terrell et al. | 370/389 |
| 2003/0221001 A1 * | 11/2003 | Moran et al. | 709/224 |
| 2004/0107300 A1 * | 6/2004 | Padmanabhan et al. | 710/1 |
| 2006/0047850 A1 * | 3/2006 | Singh Bhasin et al. | 709/238 |
| 2006/0277383 A1 * | 12/2006 | Hayden et al. | 711/170 |
| 2007/0180188 A1 * | 8/2007 | Fujibayashi et al. | 711/112 |

OTHER PUBLICATIONS

Definition of dynamic multipathing; HP; Feb. 13, 2005.*
Nixon et al., Working Draft Fibre Channel HBA API (FC-HBA), Rev. 8, Apr. 16, 2003, ftp://www.t11.org/t11/member/fc/hba/03-108v1.pdf.*
Promise Technology, Inc., VTrak J300s 12-Drive SAS-SAS/SATA 3Gb/s Storage Systems Quick Reference Guide, downloaded from web site http://www.promise.com/marketing/datasheet/file/1_VTrak%20J300s%20-Quick%20Ref%20Guide-101305.pdf on Jan. 2, 2008.

* cited by examiner

*Primary Examiner* — Tuan Thai
(74) *Attorney, Agent, or Firm* — Campbell Stephenson LLP

(57) ABSTRACT

A method and apparatus for determining a disk array enclosure serial number comprising determining logical unit number (LUN) information regarding disk drives within a disk array of a storage system, determining port information for the storage system comprising the disk array, correlating the LUN information with the port information to uniquely identify each disk drive, and defining a disk array enclosure serial number using the LUN and port information related to each disk drive.

19 Claims, 2 Drawing Sheets

METHOD AND APPARATUS FOR DETERMINING DISK ARRAY ENCLOSURE SERIAL NUMBER USING SAN TOPOLOGY INFORMATION IN STORAGE AREA NETWORK

BACKGROUND OF THE INVENTION

1. Field of the Invention

The present invention generally relates to storage area network (SAN) technology. More particularly, the present invention pertains to a method and apparatus for determining the disk array enclosure serial number using SAN topology information for storage arrays.

2. Description of the Related Art

Dynamic Multipathing (DMP) processes (also referred to herein as simply DMP) balance input/output (I/O) across all available paths between a server and array of storage devices within storage systems, to improve performance and availability. The DMP processes used in conjunction with a SAN identify the particular disks (or storage devices) in an array within a storage system. The identity of a particular disk array is known as Disk Array Enclosure Serial Number in a SAN topology. Once known, the DMP can dynamically control routing of I/O traffic to the array with high granularity, i.e., send traffic to specific disk drives. The identification of the disk array enclosure serial number is generally contained in an Array Support Library (ASL) that is provided by the array to the DMP.

Data classification in a SAN is the manual decision making process that identifies data, determines its value to the organization and classifies the data into different categories. Categories may be based on levels of protection needed, performance requirements, frequency of use, and other considerations. Tiered storage facilitates assignment of the different categories of data to different types of storage media in order to reduce total storage cost. Often, enterprise data centers utilize a different storage array for each tier. As an example of tiered storage, tier-1 data such as mission-critical, recently accessed, or top secret files are stored in a tier-1 storage array of expensive and high-quality media, such as double-parity RAIDs (redundant arrays of independent disks). Tier-2 data such as financial, seldom-used, or classified files are stored in a tier-2 storage array of less expensive media in conventional storage area networks SANs. DMP supports a majority of tier-1 storage arrays.

Array Support Library (ASL) is a dynamically loadable library (or shared library) to discover attributes of a disk array. The ASL is invoked during volume manager configuration daemon start up process. The ASL identifies a disk to device discovery layer (DDL) during runtime. The set of ASL is limited as compared to the number of array vendors in the market. The DMP supports a majority of tier-1 storage arrays, but does not support lower level arrays, i.e., certain arrays are certified for use with DMP. Hence, for the purpose of data archival where customers wish to limit the cost of storage, customers generally purchase inexpensive arrays. As there is no corresponding ASL for the uncertified arrays, some of the vital attributes, such as enclosure serial number, also known as array serial number, Vendor ID, Product ID, array name, SCSI version, used by the volume manager (VM) to manage fault tolerance across enclosure boundaries, is unavailable to the DMP process.

For arrays without ASL, the DMP views the arrays within a cabinet as a single block of storage (i.e., no granularity). Consequently, all the uncertified arrays connected to a host are configured into a single logical Just a Bunch Of Disks (JBOD) enclosure in DMP thereby compromising the fault tolerance characteristics of the SAN, which is undesirable. Particularly, in the absence of ASL, the DMP is unable to discover a unique enclosure connected to a host. Since the enclosure boundary is not recognized, multiple enclosures are categorized into one logical enclosure as JBOD. The volume manager is, thus, unable to place its configuration copies without compromising fault tolerance.

Accordingly, there is a need in the art for a method and apparatus for determining a disk array enclosure serial number within a SAN, especially when an ASL is unavailable.

SUMMARY

The present invention comprises various embodiments of a method and apparatus for determining a disk array enclosure serial number within a SAN comprising determining logical unit number (LUN) information regarding disk drives within a disk array of a storage system, determining port information for the storage system comprising the disk array, correlating the LUN information with the port information to uniquely identify each disk drive, and defining a disk drive array enclosure serial number using the LUN and port information related to each disk drive.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention is generally directed towards a method and apparatus for determining disk array enclosure serial number using SAN topology information.

Figure 1:
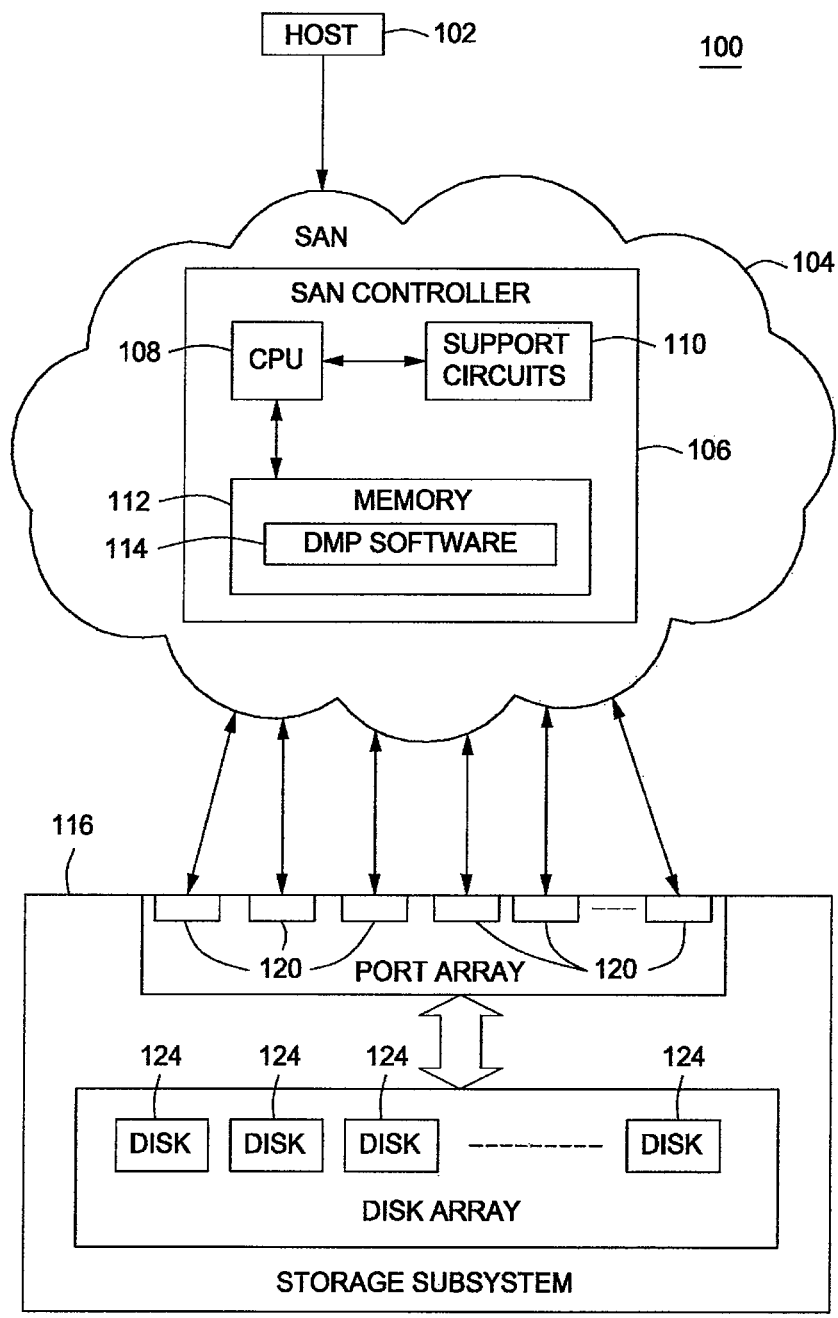
FIG. 1 is a schematic overview of a system employing an apparatus for determining an enclosure serial number using SAN topology information in accordance with at least one embodiment of the present invention.

FIG. 1 is a schematic overview of a system employing an apparatus for determining an enclosure serial number using SAN topology information in accordance with at least one embodiment of the present invention. The system 100 comprises a host 102, a storage subsystem 116, a SAN 104 and a SAN controller 106.

The apparatus is usable for practicing a method for determining an enclosure serial number using SAN topology information, in conformity with the principles of the present invention. Details in connection with the method are discussed with reference to FIG. 2. As used in the current context, the term "apparatus" implies (or refers to) the SAN controller 106 designed and implemented in accordance with the principles of the present invention. In other embodiments of the invention, the invention may be embodied in a host computer that is coupled to the SAN.

The host 102 is a computing device, such as a server or client that uses the services of the SAN. The host 102 uses the SAN to store data.

In general, SAN consists of storage elements, computer systems, a communication infrastructure for providing physical connections between the computer systems (represented by host 102) and storage elements (represented by storage subsystem 116), and the storage elements thereof and a management layer for organizing the connections. The purpose of SAN is to transfer of data between the computer systems and storage elements, and the storage elements thereof. SAN can be categorized into two broad types, namely centralized SAN and distributed SAN.

A centralized SAN contains many heterogeneous servers connected to one single storage space. The single storage space can have heterogeneous storage entities or disk drives. Centralized SAN are useful for simplifying the storage architecture in large organizations. The storage space can be treated as a black box so that administration of storage is easy. For example, centralized SAN are compatible with many heterogeneous server environments including UNIX, HPUX, SOLARIS, LINUX, WINDOWS based servers and more.

A distributed SAN contains many geographically-dispersed disk drive networks. All the networks are treated as one unit and are connected by the iSCSI storage area network protocol. Distributed SAN is a sub-network of shared storage devices that allows for all information stored to be shared among all of the servers on the network. For example, distributed SAN are most popular in large organizations with geographically dispersed storage pools that can be connected and communicated through iSCSI.

In accordance with certain embodiments of the present invention, the storage subsystem 116 and the host 102 are coupled through the SAN 104. The SAN 104 supports one or more processes, such as disk mirroring, backup and restore, archival and retrieval of archived data, data migration from one storage device to another and data sharing among different servers in a network. The SAN 104 uses existing communication technology, such as IBM's optical fiber ESCON or the newer Fibre Channel technology. Sharing the storage subsystem 116 via the SAN 104 simplifies storage administration and adds flexibility since cables and storage devices do not have to be physically moved to move storage from the host 102 to other such hosts.

Storage subsystem 116 contains an array of ports 120 and an array of disks 124. Each of the array of disks 124 has a unique logical unit serial number (LUN) assigned to it. On the other hand, each of the array of ports 120 is assigned a unique port world wide name (PWWN) identifier. In certain embodiments, the storage subsystem 116 is a collection of storage controllers and/or host bus adapters (HBAs), storage devices such as disks, CDROMs, tapes, media loaders and robots and any required control software that provides storage services to one or more computers.

Multiple paths (or multiple I/O paths) to each of the array of disks 124 through any one or more of the array of ports 120 in an enclosure will have the same logical unit number (LUN) but different port world wide name identifier (PWWN). Each of the multiple paths serves as an access path from the host 102 to each of the array of disks 124 through anyone or more of the array of ports 120. As used herein, the term "multiple I/O paths" refer to a facility by virtue of which a host directs I/O requests to a storage device on more than one access path. Multi-path I/O requires that devices be uniquely identifiable by some means other than by bus address.

In light of the above requirement, the present invention discloses a combination of LUN serial number with WWN to form a tuple that identifies various sets of paths to disks that are visible through different WWN identifiers. This aids in identification of the enclosure boundary by WWN identifiers. A combination of WWN identifiers is viewed as cabinet serial number to uniquely identify a JBOD enclosure, without the corresponding ASL.

As used herein, the term "logical unit number (LUN)" refers to an address for an individual disk drive and by extension, the disk device itself. The term is used in the Small System Computer Interface (SCSI) protocol as a way to differentiate individual disk drives within a common SCSI target device like a disk array. Precisely, a LUN is a unique identifier used on a SCSI bus that enables it to differentiate between up to eight separate devices, where each of the devices is a logical unit. Each LUN is a unique number that identifies a specific logical unit, which may be an end user, a file, or an application program. Further, SCSI is a parallel interface that can have up to eight devices all attached through a single cable, wherein the cable and the host (computer) adapter make up the SCSI bus. The bus allows the interchange of information between devices independently of the host. In the SCSI program, each device is assigned a unique number, which is either a number between 0 and 7 for an 8-bit (narrow) bus, or between 8 and 16 for a 16-bit (wide) bus. The devices that request input/output (I/O) operations are initiators and the devices that perform these operations are targets. Each target has the capacity to connect up to eight additional devices through its own controller; these devices are the logical units, each of which is assigned a unique number for identification to the SCSI controller for command processing. The term has become common in SAN and other enterprise storage fields. LUNs are normally not entire disk drives but rather virtual partitions (or volumes) of a redundant array of inexpensive or independent drives (RAID) set. For example, in SCSI, LUNs are addressed in conjunction with the controller ID of the host bus adapter (HBA), the target ID of the storage array, and an optional (and no longer common) slice ID. In the UNIX family of operating systems, these IDs are often combined into a single "word". For example, "c1t2d3s4" refers to controller 1, target 2, disk 3 and slice 4. Only Sun's SOLARIS operating system, Hewlett Packard's HP-UX and NCR Teradata's MP-RAS continue to use LUN slices, while IBM's AIX has abandoned the "ctd" nomenclature in favor of more familiar names.

The terms "World Wide Name" (WWN) or "World Wide Identifier" (WWID), as used herein, refers to a unique identifier in a storage network. Each WWN is an 8-byte number, where the first three bytes are derived from an IEEE Organizationally Unique Identifier (IEEE OUI) and the rest are from vendor-supplied information. There are two formats of WWN defined by the IEEE. First, an Original format in which addresses are assigned to manufacturers by the IEEE standards committee, and are built into the device at build time, similar to Ethernet MAC address. For example, the first 2 bytes are either hex 10:00 or 2x:xx (where the x's are vendor-specified) followed by the 3-byte vendor identifier and 3 bytes for a vendor-specified serial number. Second is a new addressing schema, wherein the first half-byte is either hex 5 or 6 followed by a 3-byte vendor identifier and 4 bytes and a half for a vendor-specified serial number.

As used in this context, the term "world wide port name" (WWPN) or "port WWN" refers to globally unique 64-bit identifier assigned to each port.

SAN controller 106 is a computing device comprising a (meaning "at least one" unless otherwise specified) central processing unit (CPU) 108, support circuits 110 and a memory 112. The CPU 108 may comprise one or more commercially available microprocessors or microcontrollers that facilitate data processing and storage. The support circuits 110 facilitate operation of the CPU 108 and comprise at least one of clock circuits, power supplies, cache, input/output circuits, and the like. The memory 112 comprises at least one non-volatile storage medium such as read only memory (ROM), random access memory (RAM), disk drive storage, optical storage, removable storage, and the like. The memory 112 further comprises a distributed multipathing software (DMP) 114 among others.

SAN controller 106 determines the LUN information regarding each of the array of disks 124. The SAN controller 106 determines the port information (or WWN or WWNP) for each of the array of ports 120. The SAN controller 106 correlates the LUN information with the port information to uniquely identify each of the array of disks 124. The SAN controller 106 defines a disk drive array enclosure serial number using SAN topology information such as the LUN and port information related to of the array of disks 124.

As used in the current context, the term "topology" refers to a logical layout of the components of a SAN and the interconnections thereof. Topology is the study of the arrangement or mapping of the elements, such as links, nodes, and the like, of a network, especially the physical (real) and logical (virtual) interconnections between nodes. Topology deals with queries such as which components are directly connected to other components from the standpoint of communication. However, topology does not deal with queries related to physical location of components or interconnecting cables.

Dynamic Multipathing (DMP) software 114 balances input/output (I/O) across all available paths between the host 102 and the array of disks 124 within the storage systems 116 to improve performance and availability. The DMP 114 in the SAN 104 identifies the particular disks (or storage devices) in the array of disks 124. Once known, the DMP 114 can dynamically control routing of I/O traffic to the array of disks 124 with high granularity that is send traffic to specific disk drives. The identification of the SAN 104 topology is generally contained in an Array Support Library (ASL).

The term "Array Support Library (ASL)", as used herein, refers to a dynamically loadable library (or shared library) to discover attributes of a disk array. The ASL is invoked during volume manager configuration daemon start up process. The ASL identifies a disk to device discovery layer (DDL) during runtime.

In some scenarios, the set of ASL is limited as compared to a number of array vendors in the market. Hence, for the purpose of data archival where customers wish to use inexpensive arrays, which are unknown to the DMP software i.e., are uncertified. As there is no corresponding ASL for these uncertified arrays, some of the vital attributes, such as enclosure serial number, also known as array serial number, Vendor ID, Product ID, array name, SCSI version, used by the volume manager (VM) to manage fault tolerance across enclosure boundaries is unavailable.

In instances where an ASL is unavailable, the DMP software 114 of the SAN controller 106 determines the SAN 104 topology for arrays, without using ASL, in accordance with embodiments of the present invention. The DMP software 114 discovers the array of disks 124 connected to the host 102 through HBAs. The DMP software 114 utilizes a device discovery layer (DDL) facility to perform the operation of device discovery. The term "device discovery", as used herein, refers to the process of discovering the array of disks 124 that are attached to the host 102. In conjunction with the ability to discover the devices attached to the host 102, the device discovery services enable addition of support dynamically for new disk arrays. This operation, which uses the DDL, is achieved without the need for a reboot.

In accordance with some embodiments of the invention, the DMP software 114 invokes an event source daemon (ESD) 126. The ESD discovers additional fabric attributes, such as node WWN and port WWN, for each of the array of disks 124. The ESD 126 uses the Fibre Channel mechanism of port world wide name (port WWN) and node world wide name (node WWN) for this. As mentioned earlier, the WWNs are unique IDs, created in a similar way to Ethernet MAC addresses; part of the WWN identifies the manufacturer of the device and the other part of the WWN is uniquely programmed by the vendor as they manufacture their many HBAs or many disk arrays. A port WWN is unique to an individual port, whereas the node WWN is unique to the node. A node in network terminology is a device, such as a host, a server, storage device among others. Therefore, regardless which of the many ports of the array of ports 120 is looked at, the node WWN remains the same, but the port WWN is different. Further, the ESD 126 constructs a topology using Storage Networking Industry Association Host Bus Adapter Application Programming Interlace (SNIA HBA API). The term "fabric", as used in the current context, refers to a computer network topology where many devices connect with each other via switches, used in some storage area networks and other high-speed interconnects, including Fibre Channel and InfiniBand.

As used in the current document, the term "SNIA Common HBA API" refers to an industry standard, programming interface for accessing management information in Fibre Channel Host Bus Adapters (HBA). Developed through the SNIA, the HBA API has been overwhelmingly adopted by Storage Area Network vendors to help manage, monitor, and deploy storage area networks in an interoperable way. The HBA API is implemented as a set of 'C' level API's which allow access to low level, Fibre Channel HBA information in a platform- and vendor-independent way. The API depends on vendor supplied, vendor specific code for the vendor's HBAs. The API does not support any vendor's HBA without a vendor specific library.

The term "event source daemon (ESD)", as used herein, refers to a process that is always running on a computer system to service a particular set of requests. For example, the VOLUME MANAGER CONFIGURATION DAEMON ("vxconfigd") is responsible for maintaining configurations of disks and disk groups in the VERITAS VOLUME MANAGER. The "vxconfigd" takes requests from other utilities for configuration changes, and communicates those changes to the kernel and modifies configuration information stored on disk. The "vxconfigd" is also responsible for initializing the VOLUME MANAGER when the system is booted. Likewise, in UNIX, lpd is a daemon that handles printing requests. Daemons are independent processes, and not part of an application program. Application requests may be serviced by a daemon.

It must be noted that the ESD 126 has complete view of the connectivity from the host 102 to the array of disks 124 and the multi-path information is available using the DMP software 114. Owing to the fact that the DMP software 114 and ESD 126 discover the same set of paths, the information from the DMP software 114 and ESD 126 are correlated on LUN serial number.

Multiple paths to each of the arrays of disks 124, accessible through different ports 120, are categorized as belonging to one enclosure. Stated otherwise, a given array of disks 124 that are accessible through a given array of ports 120 are categorized as belonging to one enclosure.

Thus, for a given enclosure a simple concatenation of the port WWN identifiers for the array of ports 120 is downloaded to the DMP software 114 as a cabinet serial number. Owing to the fact that the port WWN identifiers are unique, a concatenation of the port WWN identifiers for the array of ports 120 also remains unique, thereby, discovering the enclosure boundaries.

It must be noted here that the DMP software 114 determines the SAN topology for arrays of disks without using ASL. In order to do so, the DMP software 114 analyzes the port WWN identifiers and LUN serial numbers connected to the ports and maps the enclosures as a group of tuples (or WWN/LUN). Each of the tuples identifies the specific disk drive 124 within the storage subsystem 116. Once created, the tuples are then used in the same manner as an ASL.

Figure 2:
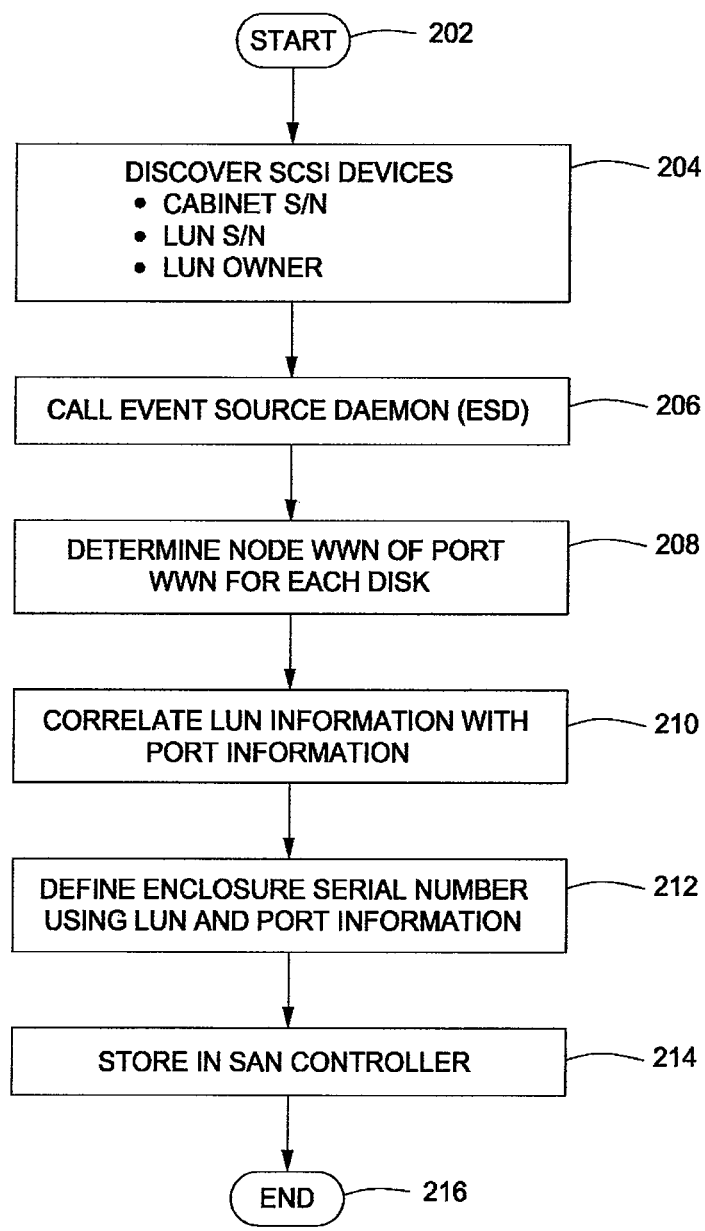
FIG. 2 depicts a flow diagram of a method for determining enclosure serial number using SAN topology information in accordance with certain embodiments of the present invention.

FIG. 2 depicts a flow diagram of a method 200 for determining SAN topology information in accordance with certain embodiments of the present invention.

The method 200 starts at step 202 and proceeds to step 204. At step 204, the method 200 discovers SCSI devices.

In certain embodiments, the method 200 discovers the storage subsystem connected to the host through HBAs. The method 200 downloads various available attributes, such as cabinet serial number (i.e., the identifier for the physical cabinet within which the enclosures (arrays) are kept), Vendor ID, Product ID, array name, SCSI version among others, regarding the storage subsystem. Thus, the method 200 determines logical unit number (LUN) information regarding each of the disks within the disk array of the storage subsystem.

At step 206, the method 200 calls the event source daemon (ESD).

At step 208, the method 200 determines node WWN and port WWN for each of the array of disks. The term "WWNN or node WWN or node world wide name" refers to a globally unique 64-bit identifier assigned to each node or disk. The method 200 employs the ESD to determine the node WWN and WWN for each of the array of disks.

At step 210, the method 200 correlates the LUN information with the port information to uniquely identify each disk drive. For example, all the disks that are accessible through a given set of port WWN identifiers for a given array of ports are categorized as belonging to one enclosure. Thus, for this enclosure a simple concatenation of WWN identifiers for the given array of ports serves as a cabinet serial number.

At step 212, the method 200 defines an enclosure serial number using the LUN and port information.

At step 214, the method 200 stores the enclosure serial number in the SAN controller (or elsewhere in the computing environment, for example, in a host computer). This enclosure serial number can then be used by the DMP software in the same manner as an ASL.

The method 200 ends at step 216.

The invention is intended to cover all equivalent embodiments, and is limited only by the appended claims. Various other embodiments are possible within the spirit and scope of the invention. While the invention may be susceptible to various modifications and alternative forms, the specific embodiments have been shown by way of example in the drawings and have been described in detail herein. The aforementioned specific embodiments are meant to be for explanatory purposes only, and not intended to delimit the scope of the invention. Rather, the invention is to cover all modifications, equivalents, and alternatives falling within the spirit and scope of the invention as defined by the following appended claims.

What is claimed is:

1. A method comprising:
   determining whether an Array Support Library (ASL) is available for a storage system; and
   in response to a determination that the ASL is not available,
      determining a topology of the storage system, wherein the topology is determined without using the ASL,
      determining a logical unit number (LUN) identifier for each of a plurality of disk drives comprised in the storage system,
      determining a WWN identifier for each of a plurality of ports comprised in the storage system,
      defining an enclosure serial number for the storage system by virtue of referencing a plurality of tuples, wherein
         the enclosure serial number is defined without using the ASL,
         each tuple of the plurality of tuples comprises
            at least one of the LUN identifiers, and
            at least one of the WWN identifiers,
         the tuples correspond to the topology of the storage system, and
         the plurality of tuples are used in the same manner as the ASL to determine the topology of the storage system;
      configuring the storage system into a dynamic multipathing environment, wherein
         the configuring is based at least in part on the enclosure serial number.

2. The method of claim 1, further comprising:
   discovering one or more SCSI devices of the storage system.

3. The method of claim 1, further comprising:
   determining at least one attribute of the disk drives of the storage system.

4. The method of claim 3, wherein
   the at least one attribute comprises at least one of
      LUN serial number,
      cabinet serial number,
      Vendor ID,
      Product ID,
      array name,
      SCSI version, or
      LUN owner.

5. The method of claim 1, further comprising:
   determining port information for the storage system, wherein
      the determining the port information comprises
         invoking an event source daemon (ESD).

6. The method of claim 5, wherein the ESD discovers a plurality of attributes for each disk in the SAN and constructs a topology using a Storage Networking Industry Association Host Bus Adapter Application Programming Interface (SNIA HBA API).

7. The method of claim 6, wherein
   at least one attribute among the plurality of attributes comprises at least one of
      a node world-wide name (node WWN), or
      a port world-wide name (port WWN).

8. The method of claim 6, wherein the ESD has a complete view of the connectivity from a host to the disk.

9. The method of claim 1, further comprising:
   discovering one or more SCSI devices of the storage system, wherein
      the discovering the one or more SCSI devices comprises
         determining at least one attribute of the disk drives of the storage system; and
   determining port information for the storage system.

10. A computer system comprising:
a processor;
a memory coupled to the processor; and
instructions, encoded in the memory and configured to cause the processor to
  determine whether an Array Support Library (ASL) is available for a storage system; and
  if the ASL is not available for the storage system,
    determine a topology of the storage system, wherein the topology is determined without using the ASL,
    determine a logical unit number (LUN) identifier for each of a plurality of disk drives comprised in the storage system, wherein
      the processor is coupled to the storage system,
    determine a WWN identifier for each of a plurality of ports comprised in the storage system,
    define an enclosure serial number for the storage system by virtue of referencing a plurality of tuples, wherein
      the enclosure serial number is defined without using the ASL,
      each tuple of the plurality of tuples comprises
        at least one of the LUN identifiers, and
        at least one of the WWN identifiers,
      the tuples correspond to the topology of the storage system, and
      the plurality of tuples are used in the same manner as the ASL to determine the topology of the storage system;
    configure the storage system into a dynamic multipathing environment based at least in part on the enclosure serial number.

11. The computer system of claim 10, wherein the processor is configured to execute dynamic multipathing (DMP) software.

12. The computer system of claim 10, wherein the storage system comprises:
an array of ports, and
an array of disks.

13. The computer system of claim 10, wherein the computer system is a storage area network (SAN) Controller.

14. The computer system of claim 10, wherein the computer system is a host computer coupled to the storage system through a storage area network (SAN).

15. The computer system of claim 10, wherein the enclosure serial number comprises a concatenation of port identifiers used by an array of ports in the storage system.

16. The computer system of claim 10, wherein the computer is configured to:
determine whether an Array Support Library (ASL) is available for the storage system; and
only if an ASL is not available for the storage system, determine one or more enclosure boundaries from the enclosure serial number.

17. A non-volatile storage medium comprising instructions executable by a processor to perform acts comprising:
determining whether an Array Support Library (ASL) is available for a storage system; and
in response to a determination that the ASL is not available,
  determining a topology of the storage system, wherein the topology is determined without using the ASL,
  determining a logical unit number (LUN) identifier for each of a plurality of disk drives comprised in the storage system;
  determining a WWN identifier for each of a plurality of ports comprised in the storage system,
  defining an enclosure serial number for the storage system by virtue of referencing a plurality of tuples, wherein
    the enclosure serial number is defined without using the ASL,
    each tuple of the plurality of tuples comprises
      at least one of the LUN identifiers, and
      at least one of the WWN identifiers,
    the tuples correspond to the topology of the storage system, and
    the plurality of tuples are used in the same manner as the ASL to determine the topology of the storage system;
  configuring the storage system into a dynamic multipathing environment, wherein
    the configuring is based at least in part on the enclosure serial number.

18. The storage medium of claim 17, wherein the enclosure serial number comprises a concatenation of port identifiers used by an array of ports in the storage system.

19. The storage medium of claim 17, wherein the acts comprise:
determining one or more enclosure boundaries from the enclosure serial number.

* * * * *

UNITED STATES PATENT AND TRADEMARK OFFICE
CERTIFICATE OF CORRECTION

PATENT NO. : 8,996,802 B1
APPLICATION NO. : 11/810800
DATED : March 31, 2015
INVENTOR(S) : Ameya Prakash Usgaonkar Page 1 of 1

It is certified that error appears in the above-identified patent and that said Letters Patent is hereby corrected as shown below:

In The Claims

Column 8
Line 50, in Claim 6, replace: "the SAN" by -- a storage area network (SAN) --

Column 10
Line 2, in Claim 16, insert: -- system -- immediately before "is configured to:"

Signed and Sealed this
Twenty-eighth Day of June, 2016

Michelle K. Lee
*Director of the United States Patent and Trademark Office*